April 21, 1925.
J. C. ROGERS
1,534,545
VEHICLE WHEEL
Filed Oct. 10, 1924
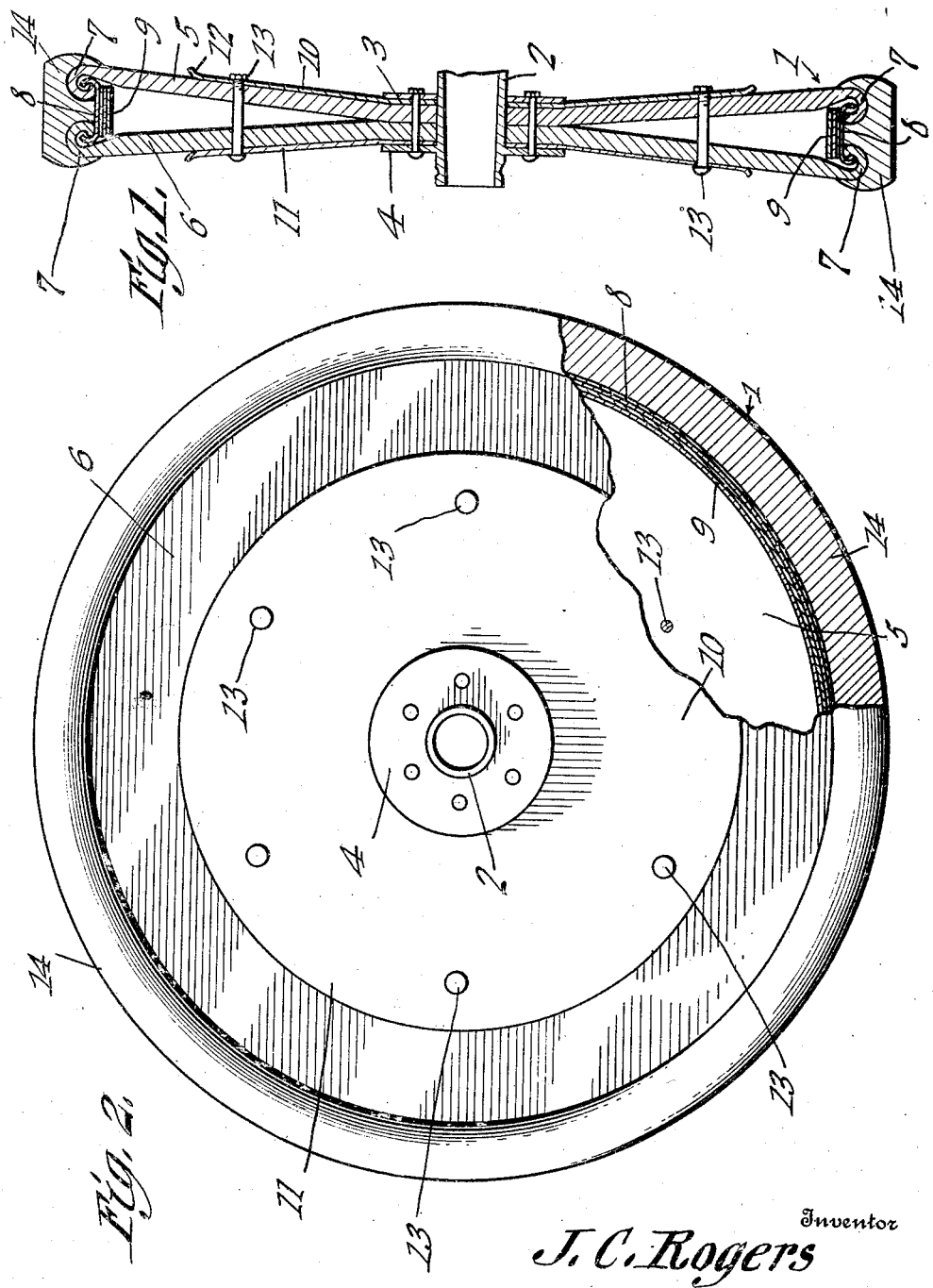
Inventor
J. C. Rogers
By C. A. Snow & Co.
Attorneys Patented Apr. 21, 1925.

1,534,545

UNITED STATES PATENT OFFICE.

JOHN CHARLES ROGERS, OF BASTROP, LOUISIANA.

VEHICLE WHEEL.

Application filed October 10, 1924. Serial No. 742,828.

*To all whom it may concern:*

Be it known that I, JOHN C. ROGERS, a citizen of the United States, residing at Bastrop, in the county of Morehouse and State of Louisiana, have invented a new and useful Vehicle Wheel, of which the following is a specification.

This invention relates to vehicle wheels and more particularly to automobile wheels so constructed as to render the use of pneumatic tires unnecessary.

The primary object of the invention is to provide a wheel of this character which will have all of the shock absorbing qualities of a pneumatic tire-equipped wheel and yet have none of its disadvantages.

Another object is to provide a wheel of this character in which the hub is suspended from the rim by flexible sides so that the effect of the road shock will be greatly absorbed in the sides of the wheel instead of being transmitted direct to the hub.

Another object is to so construct a wheel of this character that the load is distributed equally to all points of the rim and tire thus insuring the tire under normal load being perfectly round.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a horizontal section through a wheel constructed in accordance with this invention; and Fig. 2 is a side elevation thereof with parts broken out and in section.

The wheel 1 constituting this invention comprises a hub 2 having longitudinally spaced annular flanges or plates 3 and 4 radiating therefrom and between which are bolted the inner ends of the side members 5 and 6 of the wheel. These side members 5 and 6 are made in the form of disks or circular plates forming the sides of the wheel and which are constructed of any suitable flexible material or composition of material being preferably made of molded rubber and canvas. The outer edges of these plates are inwardly rolled and are designed to be secured together by a spring steel strip 8 having outturned hook-like side flanges designed to be interlockingly engaged with the inturned hook-like flanges 7 of the side members 5 and 6.

Thin plates of spring steel shown at 10 and 11 are arranged on the outer face of the disks 5 and 6 and operate as guides and supports for the flexible sides. These plates 10 and 11 terminate at their periphery at points spaced inwardly from the periphery of the plates 5 and 6 and are connected therewith and with each other by bolts 13 extending transversely through them and which when tightened or loosened provide for the proper tensioning of the sides of the wheel.

On the underside of the clincher strip or plate 8 are a plurality of annular bands or strips 9 which operate to distribute the load equally to all points on the rim of the tire thus insuring the tire being perfectly round under normal load.

Mounted on the outer edges of the connected plates 5 and 6 is a removable tread 14 composed of solid live rubber which is removable and can be readily replaced when badly worn.

The hub 2 being suspended from the rim of the tire by flexible sides instead of being supported by solid disks of wood or metal the road shocks are absorbed by said sides instead of being transmitted direct to the hub.

A wheel constructed as shown is more flexible than the present pneumatic tire, is puncture proof and may be comparatively cheaply constructed.

I claim:—

1. A vehicle wheel having a solid tire, a hub, and flexible sides suspending said hub from the rim of the tire whereby road shock is greatly absorbed by said sides instead of being transmitted direct to the hub, an annular spring steel ring located adjacent the inner perimeter of the tire and operable to equally distribute the load to all points on the tire.

2. A wheel of the class described comprising a hub having annular longitudinally spaced flanges, resilient disk-like plates secured between said flanges and diverging toward their perimeters, spring steel plates mounted on the outer faces of said disks and operating as guides and supports therefor, means for connecting and adjusting the tension of said plates, and a removable tread mounted on the perimeter of said plates.

3. A wheel of the class described comprising a hub having annular longitudinally spaced flanges, resilient disk-like plates secured between said flanges and diverging toward their perimeters, spring steel plates mounted on the outer faces of said disks and operating as guides and supports therefor, means for connecting and adjusting the tension of said plates, a removable tread mounted on the perimeter of said plates, and a clincher plate connecting said side plates at their perimeter.

4. A wheel of the class described comprising a hub having annular longitudinally spaced flanges, resilient disk-like plates secured between said flanges and diverging toward their perimeter, spring steel plates mounted on the outer faces of said disks and operating as guides and supports therefor, means for connecting and adjusting the tension of said plates and a removable tread mounted on the perimeter of said plates, a clincher plate connecting said side plates at their perimeter, and a plurality of superposed annular strips arranged on said clincher plate between the side members of the wheel.

5. A wheel of the class described comprising a hub, flexible disk-like sides secured at their centers to said hub and diverging toward their perimeters, spring steel disks arranged on the outer faces of said flexible disks and operating as guides and supports therefor, bolts extending transversely through said metal and flexible disks said bolts being adjustable to provide for the proper tensioning of the sides of the wheel, the perimeters of said sides being inturned and rolled, a clincher plate engaging said inturned rolled edges, and a removable tread mounted on said perimeters.

In testimony that I claim the foregoing as my own, I have hereto affixed my signature in the presence of two witnesses.

JOHN CHARLES ROGERS.

Witnesses:
R. B. TODD,
P. McDONALD BIDDISON.